US012579257B2

(12) United States Patent
Alves et al.

(10) Patent No.: US 12,579,257 B2
(45) Date of Patent: Mar. 17, 2026

(54) SECURITY APPLIANCE EXTENSION

(71) Applicant: Universal City Studios LLC, Universal City, CA (US)

(72) Inventors: Luis Alves, Clermont, FL (US); Sean Fitzpatrick, Winter Garden, FL (US); Steven King, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 1183 days.

(21) Appl. No.: 16/439,421

(22) Filed: Jun. 12, 2019

(65) Prior Publication Data

US 2020/0293654 A1 Sep. 17, 2020

Related U.S. Application Data

(60) Provisional application No. 62/817,304, filed on Mar. 12, 2019.

(51) Int. Cl.
*G06F 21/55* (2013.01)
*G06F 9/4401* (2018.01)
*G06F 11/32* (2006.01)

(52) U.S. Cl.
CPC .......... *G06F 21/554* (2013.01); *G06F 9/4401* (2013.01); *G06F 11/325* (2013.01); *G06F 11/327* (2013.01)

(58) Field of Classification Search
None
See application file for complete search history.

(56) References Cited

U.S. PATENT DOCUMENTS

| | | | | |
|---|---|---|---|---|
| 6,915,457 B1 * | 7/2005 | Miller | .................. | G06F 11/3476 |
| | | | | 714/38.14 |
| 7,219,239 B1 * | 5/2007 | Njemanze | ........... | H04L 63/0218 |
| | | | | 726/21 |
| 7,934,253 B2 * | 4/2011 | Overcash | ................ | G06F 21/55 |
| | | | | 726/25 |
| 8,839,349 B2 * | 9/2014 | Pearcy | .................. | G06F 21/566 |
| | | | | 726/1 |
| 8,898,273 B2 * | 11/2014 | Harhi | ...................... | H04L 43/10 |
| | | | | 709/217 |
| 9,031,916 B2 * | 5/2015 | Huang | .................. | G06F 21/552 |
| | | | | 707/672 |
| 9,166,989 B2 * | 10/2015 | Huang | .................. | G06F 21/552 |
| 9,396,089 B2 * | 7/2016 | Clements | ................ | G06F 11/34 |

(Continued)

FOREIGN PATENT DOCUMENTS

| | | |
|---|---|---|
| CN | 105530136 A | 4/2016 |
| JP | 2013156789 A | 8/2013 |

(Continued)

OTHER PUBLICATIONS

PCT/US2020/021901 International Search Report and Written Opinion dated Jun. 12, 2020.

(Continued)

*Primary Examiner* — Matthew J Brophy
(74) *Attorney, Agent, or Firm* — Fletcher Yoder, P.C.

(57) ABSTRACT

Systems and methods are disclosed that receive and characterize security event data. Based upon a customized severity characterized security event data, presentation and/or control actions, such as prioritized presentation and alarm generation are performed.

21 Claims, 9 Drawing Sheets

(56) References Cited

U.S. PATENT DOCUMENTS

| | | | | |
|---|---|---|---|---|
| 9,413,629 | B2* | 8/2016 | Harhi | H04L 41/12 |
| 9,548,994 | B2* | 1/2017 | Pearcy | G06F 21/554 |
| 10,079,841 | B2* | 9/2018 | Gupta | G06F 21/566 |
| 10,122,748 | B1* | 11/2018 | Currie | H04L 63/1433 |
| 10,162,727 | B2* | 12/2018 | Clements | G06F 11/0715 |
| 10,250,619 | B1* | 4/2019 | Park | H04L 63/18 |
| 11,146,572 | B2* | 10/2021 | Gupta | H04L 63/145 |
| 2003/0051026 | A1* | 3/2003 | Carter | H04L 41/0816 |
| | | | | 709/224 |
| 2004/0123304 | A1 | 6/2004 | Black et al. | |
| 2006/0129877 | A1 | 6/2006 | Yamamoto et al. | |
| 2007/0234426 | A1* | 10/2007 | Khanolkar | H04L 63/1408 |
| | | | | 726/23 |
| 2007/0288925 | A1* | 12/2007 | Hughes | G06F 9/542 |
| | | | | 718/100 |
| 2008/0034425 | A1* | 2/2008 | Overcash | H04L 63/1425 |
| | | | | 726/22 |
| 2008/0162592 | A1* | 7/2008 | Huang | H04L 41/0686 |
| 2009/0217267 | A1* | 8/2009 | Gebhart | G06F 11/3409 |
| | | | | 718/100 |
| 2010/0011031 | A1* | 1/2010 | Huang | G06F 21/552 |
| | | | | 707/E17.007 |
| 2010/0128432 | A1* | 5/2010 | Miller | G06F 1/20 |
| | | | | 361/679.54 |
| 2012/0254607 | A1* | 10/2012 | Chittigala | H04L 63/0428 |
| | | | | 713/150 |
| 2013/0097662 | A1* | 4/2013 | Pearcy | H04L 63/20 |
| | | | | 726/1 |
| 2014/0101232 | A1* | 4/2014 | Harhi | G06F 11/2294 |
| | | | | 709/203 |
| 2015/0039758 | A1* | 2/2015 | Harhi | H04L 41/12 |
| | | | | 709/224 |
| 2015/0074750 | A1* | 3/2015 | Pearcy | G06F 21/554 |
| | | | | 726/1 |
| 2015/0347265 | A1* | 12/2015 | Clements | G06F 11/0778 |
| | | | | 714/45 |
| 2016/0212159 | A1* | 7/2016 | Gupta | G06F 21/54 |
| 2016/0285872 | A1 | 9/2016 | Polar et al. | |
| 2017/0031798 | A1* | 2/2017 | Clements | G06F 11/0715 |
| 2017/0270295 | A1 | 9/2017 | Park et al. | |
| 2018/0316729 | A1* | 11/2018 | Chauvet | G06F 9/5027 |
| 2018/0324195 | A1* | 11/2018 | Gupta | G06F 21/566 |
| 2019/0260781 | A1* | 8/2019 | Fellows | H04L 51/212 |

FOREIGN PATENT DOCUMENTS

| | | |
|---|---|---|
| JP | 2018121218 A | 8/2018 |
| KR | 20170056876 A | 5/2017 |

OTHER PUBLICATIONS

SG Office Action for Singapore Application No. 11202108934U mailed Sep. 19, 2023.

JP Office Action for Japanese Application No. 2021-552559 mailed Feb. 20, 2024.

AE Office Action for United Arab Emirates Application No. P6001588/21 mailed Oct. 5, 2024.

* cited by examiner

200

MONITOR PROTECTED
COMPONENT FOR EVENTS ⌐202

EVENT? ⌐204

NO

YES

CHARACTER
BASED UPON DRSS MAPPING ⌐206

PROVIDE WITH CHARACTERIZATION
FOR PRESENTATION BY SAG PANEL ⌐208

300

RECEIVE EVENT ⌐302

IDENTIFY CHARACTERIZATION ⌐304

DETERMINE PRESENTATION AND
CONTROL ACTIONS FOR EVENT
BASED UPON CHARACTERIZATION ⌐306

PERFORM
PRESENTATION AND CONTROL CATIONS ⌐308

SECURITY APPLIANCE EXTENSION

CROSS-REFERENCE TO RELATED APPLICATIONS

The present application claims the benefit of U.S. Provisional Application No. 62/817,304, entitled "SECURITY APPLIANCE EXTENSION," and filed Mar. 12, 2019, the disclosure of which is incorporated herein by reference for all purposes.

BACKGROUND

The present disclosure relates generally to a security appliance. More specifically, certain embodiments of the present disclosure relate to a user interface that performs specific actions based upon characterizations of events generated in a security log.

In the Digital Age, the proliferation of digital data has created an increased need for cybersecurity, tasked with protecting this digital data. Typically, cybersecurity threats are provided to a Security Operation Center (SOC) or Network Operations Center (NOC), where a cybersecurity team is tasked with monitoring, prioritizing, and remediating these cybersecurity threats. Unfortunately, however, as the number of cybersecurity threats is on the rise, it is becoming increasingly inefficient to rely on human subjectivity to prioritize and remediate these threats. Accordingly, there is a need to provide improved prioritization, presentation, and remedial action for cybersecurity events that is not burdened by the inefficiencies of human subjectivity.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

Embodiments described herein relate to a security appliance extension that efficiently receives and prioritizes security events and implements security event actions based upon these security events. More specifically, the security events are characterized based upon a customized severity characterization mapping. The customized severity characterization for the event is used to determine a particular set of actions to implement for the action.

By way of example, in an embodiment, an electronic device includes an embedded computer with one or more processors. The processors receive one or more security event messages from a security appliance, the one or more security event messages each indicating a security event associated with a protected component. The processors identify a customized severity characterization of the one or more security event messages and determine one or more presentation or control actions to be performed based upon the customized severity characterization. The one or more presentation or control actions are then performed by the processors.

In an embodiment, a tangible, non-transitory, computer-readable medium, includes computer-readable instructions. Execution of the instructions by one or more processors of a computer cause the computer to receive one or more security event messages from a security appliance. The one or more security event messages each indicate a security event associated with a protected component. Execution of the instructions by the one or more processors of the computer also cause the computer to identify a customized severity characterization of the one or more security event messages, determine one or more presentation or control actions to be performed based upon the customized severity characterization, and perform the one or more presentation or control actions In an embodiment, a computer-implemented method includes receiving, via a computer, one or more security event messages from a security appliance. The one or more security event messages each indicate a security event associated with a protected component. The method also includes identifying, via the computer, a customized severity characterization of the one or more security event messages. The customized severity characterization includes a severity expected by the computer identified based upon a mapping to at least a severity indicated in the one or more security event messages. The method further includes determining one or more presentation or control actions to be performed based upon the customized severity characterization, and performing the one or more presentation or control actions.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Figure 1:
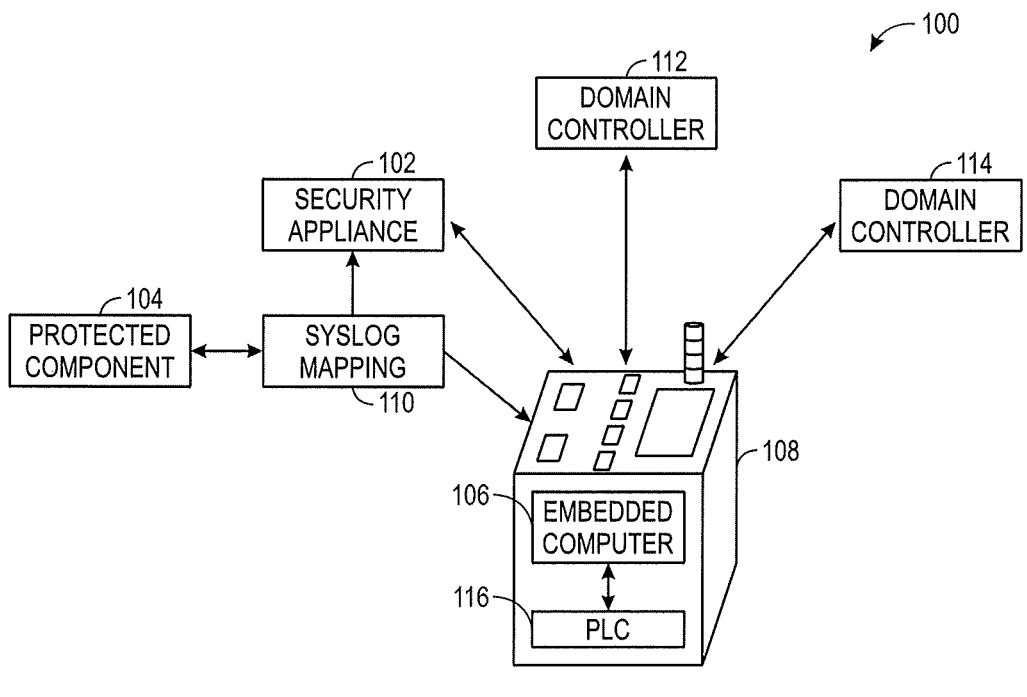
FIG. 1 is a schematic diagram, illustrating a Detection and Response Security System (DRSS), in accordance with an embodiment of the present disclosure.

The present disclosure generally relates to a Detection and Response Security System (DRSS) that provides automatic prioritization and presentation of cybersecurity events. The DRSS may facilitate control actions from a user interface, enabling fast response to cybersecurity threats. With this in mind, FIG. 1 is a schematic diagram, illustrating a Detection and Response Security System (DRSS) 100, in accordance with an embodiment of the present disclosure. The DRSS 100 provides an indication of security events generated by a security appliance 102, which is monitoring a protected component 104. In some embodiments, the protected component 104 may be an amusement park attraction. The security appliance 102 monitors the protected component 104 for cybersecurity events, which may be indicated by message logging of the event. For example, as used herein, "Syslog" refers to a standard for message logging. Though the term "Syslog" will be used herein, it should be understood that the current technique could work with a multitude of message logging standards and, thus, the use of the term "Syslog" is not intended to limit the current techniques to the Syslog standard. The Syslog message logging standard includes many message components. For example, Syslog messages can provide a facility code, which is used to specify the type of program logging the message. A table of facility codes with associated keywords and descriptions is provided below:

| Facility code | Keyword | Description |
| --- | --- | --- |
| 0 | kern | Kernel messages |
| 1 | user | User-level messages |
| 2 | mail | Mail system |
| 3 | daemon | System daemons |
| 4 | auth | Security/authentication messages |
| 5 | syslog | Messages generated internally by syslog |
| 6 | lpr | Line printer subsystem |
| 7 | news | Network news subsystem |
| 8 | uucp | UUCP subsystem |
| 9 | cron | Clock daemon |
| 10 | authpriv | Security/authentication messages |
| 11 | ftp | FTP daemon |
| 12 | ntp | NTP subsystem |
| 13 | security | Log audit |
| 14 | console | Log alert |
| 15 | solaris-cron | Scheduling daemon |
| 16-23 | local0-local7 | Locally used facilities |

Additionally, Syslog messages may include a list of severities. A table of severities that may be present in Syslog messages is provided below:

| Value | Severity | Keyword | Deprecated Keywords | Description | Condition |
| --- | --- | --- | --- | --- | --- |
| 0 | Emergency | emerg | panic | System is unusable | A panic condition. |
| 1 | Alert | alert | | Action must be taken immediately | A condition that should be corrected immediately, such as a corrupted system database. |
| 2 | Critical | crit | | Critical conditions | Hard device errors. |
| 3 | Error | err | Error | Error conditions | |
| 4 | Warning | warning | warn | Warning conditions | |
| 5 | Notice | notice | | Normal but significant conditions | Conditions that are not error conditions, but that may require special handling. |
| 6 | Informational | info | | Informational messages | |

-continued

| Value | Severity | Keyword | Deprecated Keywords | Description | Condition |
|-------|----------|---------|---------------------|-------------|-----------|
| 7 | Debug | debug | | Debug-level messages | Messages that contain information normally of use only when debugging a program. |

The DRSS 100 may include a Security Appliance Extension (SAE) 108 that may receive Syslog outputs from the security appliance 102. The Security Appliance Extension 108 and/or the security appliance 102 may translate the Syslog message, such that the Security Appliance Extension 108 may provide a graphical user interface and/or stack light output that provides an easy to interpret indication of the Syslog message. The translation of the Syslog message entails computer-implemented customized severity characterization of the Syslog message based upon components of the Syslog message (e.g., the severity value and/or the facility code). The customized severity characterization can be used to determine a severity characterization that differs from a native severity classification of a security message. This may be beneficial to create custom severity characterizations specific to a particular type of protected component, etc. For example, amusement park attractions could have a much different severity characterization for security events than an online gaming server environment, etc.

To do this, a syslog mapping script 110 may be executed at the security appliance 102 and/or an embedded computer 106. The syslog mapping script 110 results in a characterization of the Syslog message according to the characteristics of the Syslog message. Based upon the characterization, the SAE 108 may provide a graphical presentation of the Syslog event and/or may actuate one or more lights of a stack light in a particular pattern to indicate the Syslog event with the particular characterization.

To perform SAE 108 functionalities, the DRSS 100 may interface with internal and external sources. For example, the DRSS 100 may interface with a security appliance 102 (e.g., a Syslog server), which is an external security sensor that sends Syslog messages to the DRSS 100. The DRSS 100 may continuously listen for incoming messages and handle (e.g., characterize) the messages according to their severity and/or other message characteristics.

Additionally, the DRSS 100 may interface with a domain controller 112. The domain controller may enable user authentication for the DRSS 100 and the SAE 108. As will be discussed in more detail below, user authentication may enable functionality of the SAE 108 that is not available to unauthorized users. In embodiments that interface with the domain controller 112, the DRSS 100 may continuously check for a healthy connection to the domain controller 112 and generate an alarm when a healthy connection is lost.

Further, the DRSS 100 may log data in a database 114. For example, the database 114 may include a table that includes data to configure the alarm colors to associate with the various characterizations of the Syslog messages. Further, a Syslog table of Syslog messages that are received from the Syslog server may be maintained in the database 114 along with an indication of when a Syslog message is cleared and by whom. The DRSS 100 may periodically run a cleanup procedure that purges the Syslog Table as part of database 114 maintenance.

The DRSS 100 may also include a programmable logic controller (PLC) 116, which handles input/output (TO) interactions with the DRSS 100. The PLC 116 receives commands from the SAE 108 application running on the DRSS 100 and performs the commands based upon the IO of the SAE 108.

It is desirable to continuously monitor the DRSS 100 to ensure that the DRSS 100 is not failing to provide Syslog event indications. Accordingly, in some embodiments, one task of the PLC 116 is to execute a "Watchdog" function that continuously monitors the DRSS 100 to determine whether the SAE 108 application of the DRSS 100 and/or the operating system of the embedded computer 106 have failed. To do this, the PLC 116 continuously changes a state of a variable in the PLC 116. Upon detection that a state change has not occurred/been reported by the SAE 108 application within a threshold time period (e.g., 10 seconds), a Watchdog fault is generated and a corresponding alarm is presented by the DRSS 100. For example, a special stack light actuation may be presented to represent the Watchdog fault. In one embodiment, the special stack light actuation extinguishes green and blue stack lights and engages yellow and red stack lights. Additionally and/or alternatively, in some embodiments, an audible alarm is engaged to signal the Watchdog fault.

To reset the Watchdog fault, a special bypass 10 may be used. For example, in one embodiment, a Run/Bypass key switch may be switched to "Bypass" to silence the alarm. A "Reset" key switch may be turned and held for a period of time (e.g., at least 10 seconds), causing the embedded computer 106 to power down. Releasing the hold on the "Reset" key causes the embedded computer 106 to restart. The DRSS 100 may then restart the SAE 108 application and the Run/Bypass key switch may be switched to "Run" to ensure that subsequent Watchdog faults are not bypassed.

Figure 2:
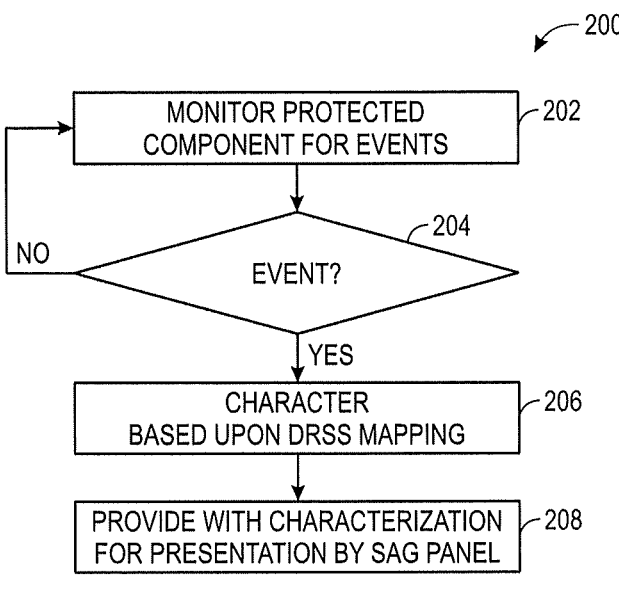
FIG. 2 is a flowchart, illustrating a process for characterizing security events, in accordance with an embodiment of the present disclosure.

Turning to a discussion of the characterization of the Syslog messages, FIG. 2 is a flowchart, illustrating a process 200 for characterizing security events, in accordance with an embodiment of the present disclosure. The process 200 begins by monitoring for events (e.g., Syslog messages) associated with a protected component (block 202). As mentioned above, a Syslog server may provide Syslog messages to the DRSS 100, indicating that a security event has occurred. If, at decision block 204, no event is detected, monitoring is continued until an event is detected.

When an event is detected, the event (e.g., the Syslog message) is characterized based upon a DRSS 100 Syslog mapping (block 206). As mentioned above, the characterization may be implemented by executing the Syslog mapping script 110, either at the security appliance 102/Syslog server and/or at the Embedded Computer 106 of the DRSS 100. The characterization may map one or more characteristics of the Syslog message into a DRSS severity level, which, in some embodiments, may include three different levels of severity: Severity 4: High/Critical, Severity 3: Medium, and Severity 2: Low. For example, Syslog messages that include a severity of 0-2 in the Syslog message could be mapped to a characterization of Severity 4 for DRSS 100 purposes. Further, Syslog messages with a severity of 3-4 could be mapped to a characterization of Severity 3 for DRSS 100 purposes. Syslog messages with a severity of 5-7 could be mapped to a characterization of Severity 2 for DRSS purposes. By reducing Syslog severities from 7 down to a characterization of 3 severities, increased prioritization efficiencies may be observed. Further, the Syslog mapping script 110 may be customized to provide fewer or more severity levels and may map to a multitude of items found in the Syslog message. For example, a combination of Syslog severity and a particular facility may map to a higher severity in the DRSS 100 than a combination of the same Syslog severity with a different facility code.

Once the characterization is determined, the Syslog message (e.g., the security event) is associated with the characterization and provided for use by the SAE 108 (block 208). The characterization may be used to perform presentation and/or control actions at the SAE 108 for the Syslog message. For example, in some embodiments, for a Syslog message characterized as a Severity 4 event, a flashing red light may be actuated with an audible alarm. Further, a red alarm banner may be presented on a graphical user interface (GUI) of the SAE 108. Additionally, status variables that are maintained by the embedded computer 106 may be toggled. For example, a variable indicating that "No Alarm is Present" and a variable indicating that "No Critical Alarm is Present" may both be toggled off. For Syslog messages characterized as Severity 3, different actions may occur. In one embodiment, a solid red light is actuated. Further, a red alarm banner may be presented on the GUI of the SAE 108. The variable indicating that "No Alarm is Present" may be toggled off, while the variable indicating "No Critical Alarm is Present" may retain its status. For Syslog messages characterized as Severity 2, a solid yellow light may be actuated. A yellow alarm banner may be presented at the GUI of the SAE 108. The variable indicating that "No Alarm is Present" may be toggled off, while the variable indicating "No Critical Alarm is Present" may retain its status.

Figure 3:
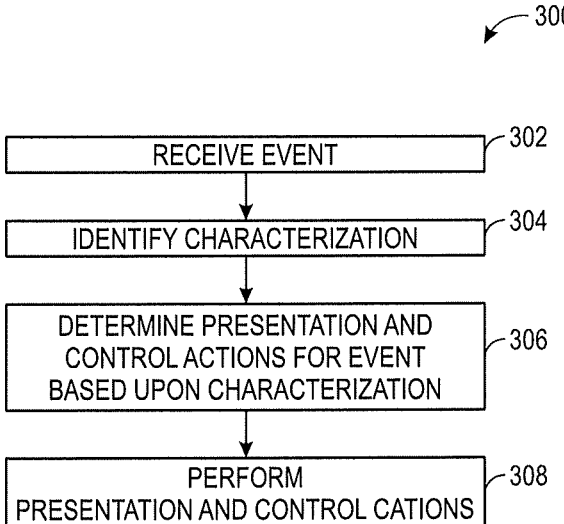
FIG. 3 is a flowchart, illustrating a process for performing presentation and control actions based upon a security event classification, in accordance with an embodiment.

Turning now to a more detailed discussion of characterization-based presentation and control actions, FIG. 3 is a flowchart, illustrating a process 300 for performing presentation and control actions based upon a security event classification, in accordance with an embodiment. As mentioned above, a security event (e.g., Syslog message) is received (block 302). The characterization for the security event is identified (block 304). For example, the characterization made in process 200 may be stored in the database 114 and retrieved to identify the characterization for the security event.

Presentation and/or control actions for the security event may be determined based upon the characterization (block 306). For example, stack light/light-emitting diode (LED) and/or audio actuation may be determined based upon the characterization, as follows:

| Red Light - Solid | This indicates a Medium alarm or a Watchdog Fault. If Medium alarm is present on the alarm banner, alarm needs to be cleared. If DRSS 100 application is unresponsive, the system must be reset. |
|---|---|
| Red Light - Flashing | This indicates a High/Critical alarm and needs to be cleared in the DRSS 100 application. |

-continued

| Yellow Light - Solid | This indicates a Low alarm or Watchdog Fault. If Low alarm is present on the alarm banner, alarm needs to be cleared. If DRSS 100 application is unresponsive, the system must be reset. |
|---|---|
| Blue Light - Solid | This indicates that all system interfaces are communicating and the system is in "Run" mode. If this light is extinguished, then either the Run/Bypass key switch is turned to "Bypass" or there is a Watchdog Fault. |
| Green Light - Solid | This indicates that the PLC 116 is communicating with the DRSS 100 application and program logic is executing. If this light is extinguished, then there is a Watchdog Fault and the DRSS 100 must be reset. |
| Sound - Flashing | This indicates a High/Critical alarm and Flashes in parallel with the red light. |
| Sound - Short Chirp | This indicates that a new alarm has been generated and serves as an audible indication that operator interaction is required. |
| Sound - Solid | This indicates that there is a Watchdog Fault and the DRSS unit must be reset. |

The diagnostic matrix below provides another indication of the actuations indicated in the table above, this time also indicating the IO key settings for the Run/Bypass Key Switch, which is described in more detail below. It should also be noted that multiple security events with multiple characterizations could be present at the same time. Accordingly, multiple of these actuations could be present in combination with one another.

|  | A | B | C | D | E | F | G |
|---|---|---|---|---|---|---|---|
| Red Light - Solid |  |  |  | X |  | X | X |
| Red Light - Flashing |  |  | X |  |  |  |  |
| Yellow Light - Solid |  |  |  |  | X | X | X |
| Blue Light - Solid | X |  |  |  |  |  | X |
| Green Light - Solid | X | X |  |  |  |  | X |
| Sound - Flashing |  |  |  | X | X |  |  |
| Sound - Solid |  |  |  |  |  | X | X |

A. Run/Bypass Key Switch in "Run"
B. Run/Bypass Key Switch in "Bypass"
C. High/Critical Alarm
D. Medium Alarm
E. Low Alarm
F. Watchdog Fault
G. Test Lamp Push Button Pressed In the table above, the left-most column provides an indication of LED and alarm outputs of the DRSS 100. The upper-most row provides an indication of DRSS 100 states (summarized by Key items A-G below the table). The "X"s indicate which of the DRSS 100 states provoke the specified LED and alarm outputs of the DRSS 100. In some embodiments, this table of LED and alarm outputs and their corresponding DRSS 100 states is a representation of logic implemented in circuitry and/or machine-readable instructions implemented by the DRSS 100.

Upon determining the proper presentation and/or control actions, these presentation and/or control actions are implemented by the DRSS 100 (block 308). For example, as will be discussed in more detail below, the stack light may be wired to the DRSS via a terminal block on the rear of the unit. LEDs may be wired together to the stack light, to display common indications.

Figure 4:
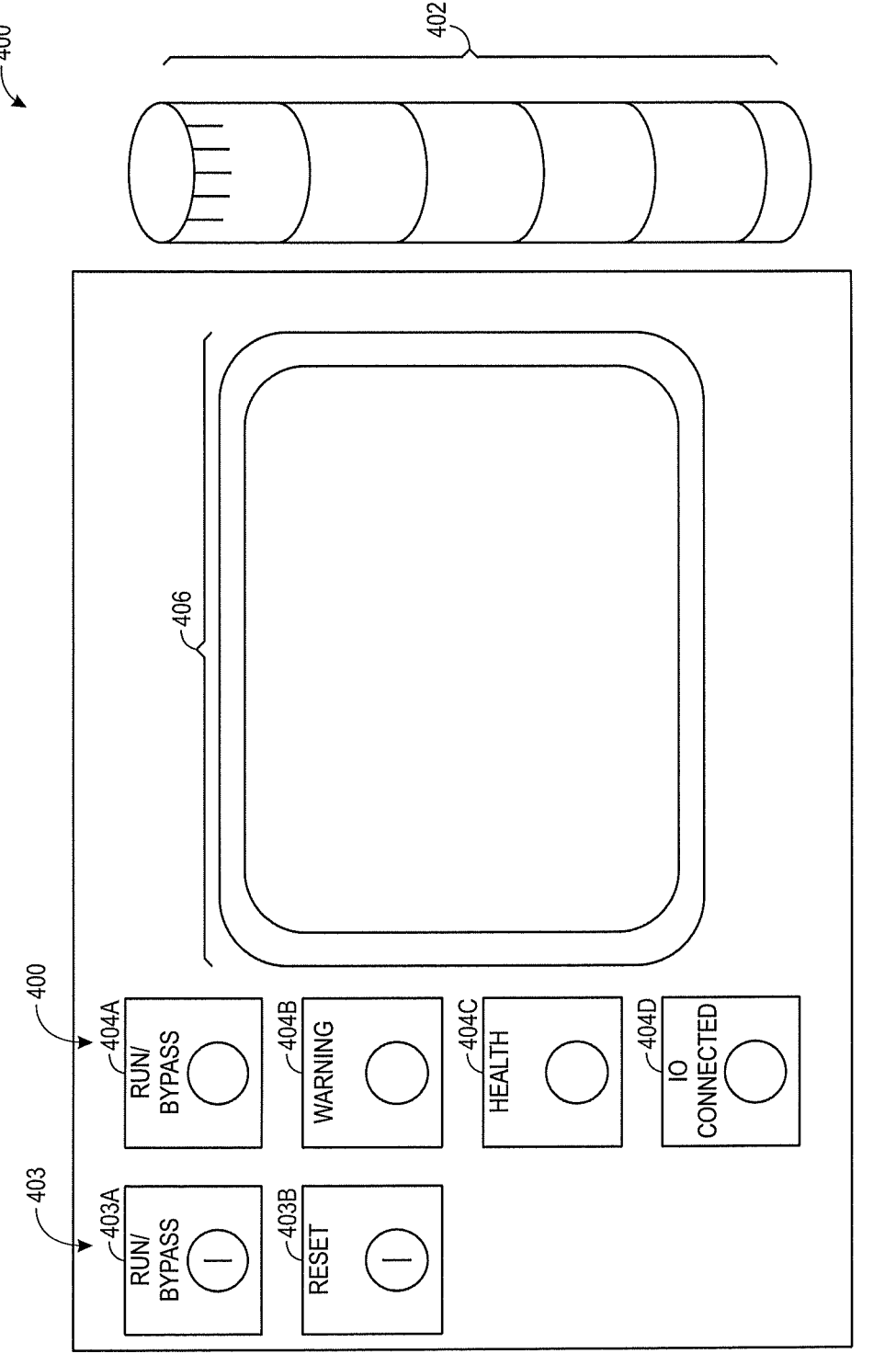
FIG. 4 is a schematic drawing of a security appliance extension user interface, in accordance with an embodiment.

FIG. 4 is a schematic drawing of a security appliance extension (SAE) panel 400 with a stack light 402, in accordance with an embodiment. The SAE panel 400 notifies operators of system alarms received from an external source (e.g., the Syslog server) and can, optionally, interface with the external system to provide external control to the protected component 104. Once an alarm action to be implemented is identified, the DRSS 100 will activate the necessary LEDs 404 and stack light 402 modules. Further, the alarm indications may be presented on the display 406, which displays the SAE 108/DRSS 100 application and provides a graphical user interface (GUI) with alarm banners that indicate the security event and its associated characterization. The display 406 may be a touch screen that enables an operator to clear security events and perform other control operations, as will be discussed in more detail below.

The SAE panel 400 may include Key Switches 403. A bypass key switch 403A is a Run/Bypass Key Switch that is a two-position key switch that places the SAE 108 in either Run or Bypass mode, depending on which of the two-positions the switch is enabled. In Bypass Mode, control interface outputs disregard present alarms and are maintained ON. The DRSS 100 application continues to display and log alarms. In the Run mode, control interface outputs are actuated based upon the received security events, as described herein.

Further, a reset switch 403B may also be provided. As discussed above, the reset switch 403B may be a key switch that may be turned and held for a period of time (e.g., at least 10 seconds), causing the embedded computer 106 to power down. Releasing the hold on the "Reset" key causes the embedded computer 106 to restart.

Discussing the LEDs 404 in more detail, LED 404A is a Fault LED that indicates a critical security event characterization when in a first state (e.g., blinking) and a medium security event characterization when in a second state (e.g., solid). The LED 404B is a Warning LED that indicates a low alarm characterization. The LED 404C is a Health LED that indicates that all interfaces are connected and the Run/Bypass key is in the "Run" position rather than in the "Bypass Position." The LED 404D is an IO Connected LED that indicates that the PLC 116 is connected and running IO logic.

Figure 5:
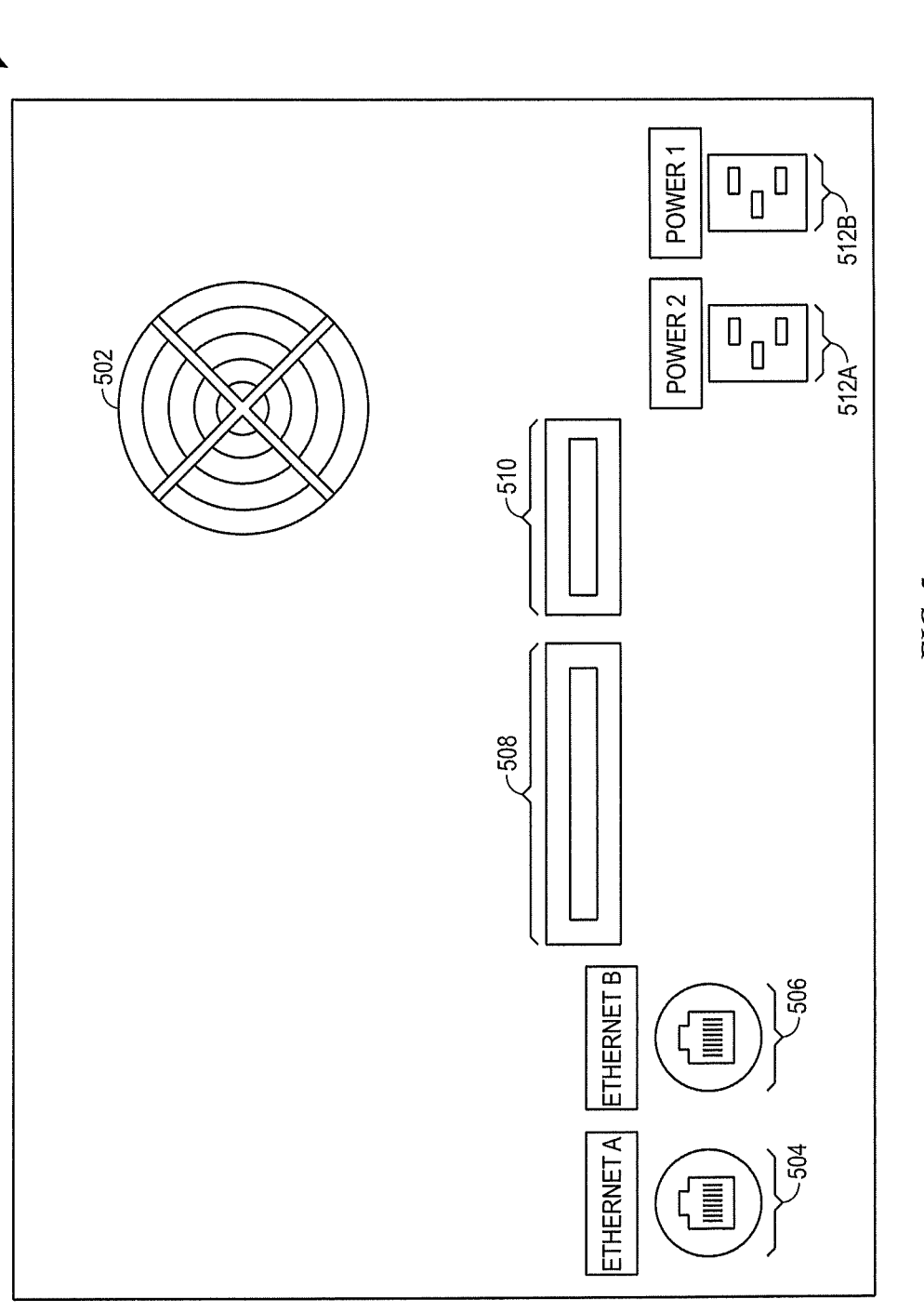
FIG. 5 is a schematic drawing of a back view of the security appliance extension user interface, in accordance with an embodiment.

Turning now to the external interfaces of the SAE 108, FIG. 5 is a schematic drawing of a back view of the SAE panel 400, in accordance with an embodiment. As illustrated, the SAE panel 400 includes a cooling fan 502, which provides air flow to the SAE panel 400.

The SAE panel 400 includes a first communications port 504, here an RJ45 Ethernet port, which is used to communicatively couple the embedded computer 106 with the Syslog server (e.g., Security Appliance 102 of FIG. 1). As previously mentioned, the Syslog server provides the Syslog messages, which ultimately become characterized security events that trigger presentation and/or control actions, as discussed herein.

The SAE panel 400 also includes a second communications port 506, here an RJ45 Ethernet port, which is used to communicatively couple the embedded computer 106 with the domain controller 112 of FIG. 1. As previously mentioned, the domain controller 112 may facilitate user authentication, enabling protected control functions, as will be discussed in more detail below.

The SAE panel 400 also includes a stack light/test lamp push button interface 508. The stack light/test lamp push button interface 508 is a terminal to connect the alarm indicator stack light 402 of FIG. 4 and the test lamp push button, which can be pressed to perform a diagnostic light up test of the stack light 402. The diagnostic test results in momentary energizing of all lights and sounds on the stack light 402.

The SAE panel 400 also includes a control interface 510. The control interface 510 connects the SAE panel 400 to external interfaces to include as possible triggers for presentation and/or control actions. The PLC 116 may provide a designated output via the control interface 510 to establish continuity between the output and common terminals on the control interface terminal block. If a designated condition is met, the PLC 116 changes the output status, resulting in broken continuity. The remote interface outputs supported by the control interface 510 include: No Alarm Present, which is maintained ON, but is turned OFF if any alarm is present; and No Critical Alarm, which is a pair of outputs that are maintained ON but turned OFF only when a Critical alarm is present. As mentioned above, these changes in status are actuated when the Run/Bypass Key Switch 403A is switched to "Run." However, when the Run/Bypass Key Switch 403A is switched to "Bypass", No Alarm Present and No Critical Alarm outputs will be maintained to ON regardless of any alarms present.

In some embodiments, the control interface 510 may cause operational changes to the protected component. For example, the control interface 510 may connect to an amusement attraction and control the amusement attraction operation based upon the characterized security events/generated alarms. For example, when a critical severity security event is present, the amusement attraction (e.g., ride) may be halted and/or other mitigating actions may be taken.

The SAE panel 500 may, in some embodiments, include redundant power supplies 512A and 512B. By having dual power supplies, if power to one of the power supplies 512A or 512B fails, power supply can be maintained by the alternate power supply 512A or 512B. As will be discussed in more detail below, during such an event, a local alarm may be presented, indicating which of the power supplies 512A or 512B has failed.

Figure 6:
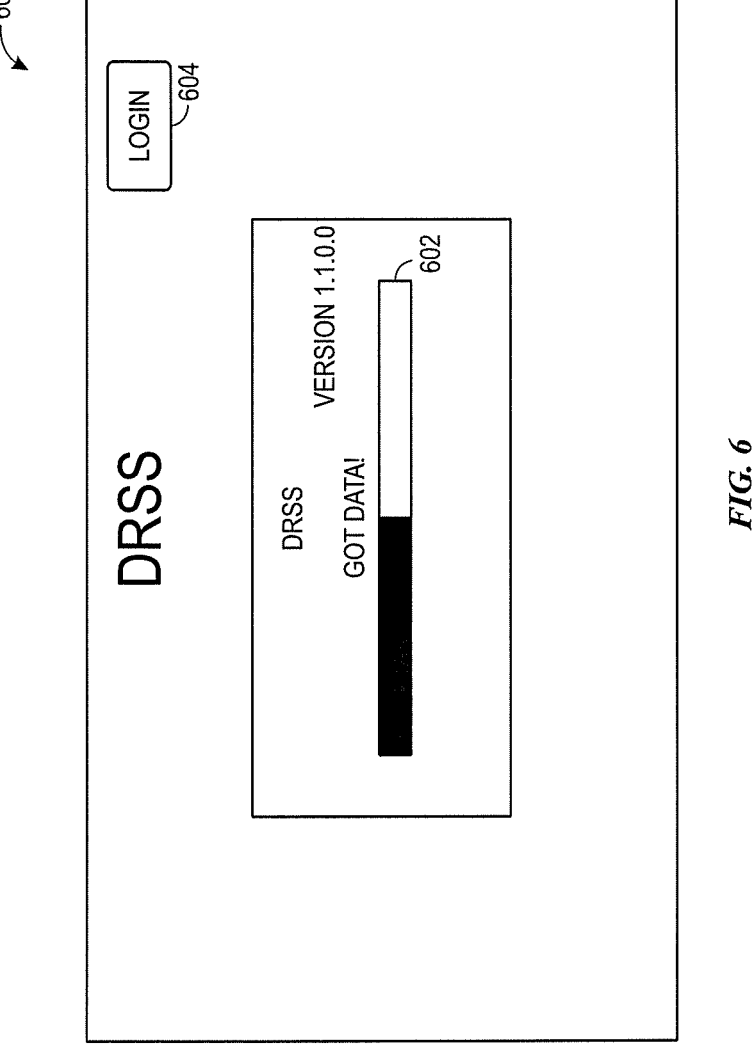
FIG. 6 is a schematic view of a graphical user interface (GUI) that illustrates security event data capture by the DRSS, in accordance with an embodiment.

Turning now to a more detailed discussion of the DRSS 100/SAE 108 application GUI, FIG. 6 is a schematic view of a graphical user interface (GUI) start up screen 600 that illustrates security event data capture by the DRSS, in accordance with an embodiment. As previously mentioned the DRSS 100 application is responsible for listening to incoming security events (e.g., Syslog messages) and alerting operators of such messages via the stack light, LEDs, and an Alarm Banner. The application is capable of logging alarm history to include the time received, a time the alarm was cleared, and the user who cleared the alarm. As mentioned above, the application may be secured using domain authentication and may contain a native validation UI that authenticates at the application level rather than requiring a switch of users at the operating system level.

As illustrated in the startup screen 600, when the DRSS 100 application first starts, it runs the start process where it connects to all system interfaces. If an interface fails to communicate, a message describing the communication failure will be displayed on the start up screen 600 and the application will automatically attempt to reconnect after a period of time (e.g., 10 seconds). Once an initial set of data is retrieved (e.g., data indicating communications with the system interfaces and/or event messages), the progress bar 602 will indicate that 100% of the loading process is complete and the start screen 600 will transition to a main display screen. During the loading process, an operator can login, using the login affordance 604. By logging in, the operator can perform protected actions only available to authenticated users. The login process will be discussed in more detail below.

Figure 7:
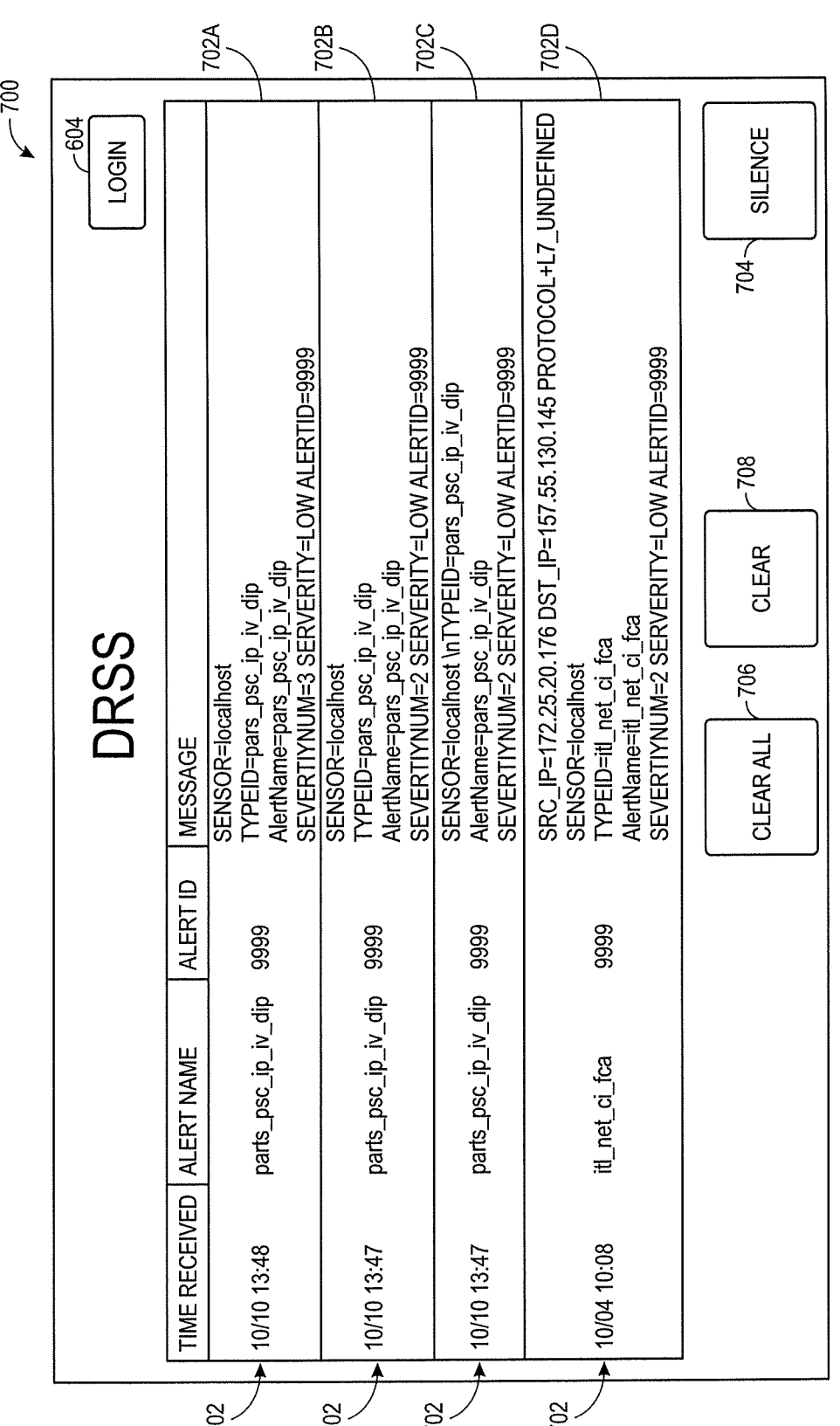
FIG. 7 is a schematic view of a GUI of the DRSS that presents security events, in accordance with an embodiment.

FIG. 7 is a schematic view of a DRSS 100 application GUI main display screen 700, in accordance with an embodiment. The main display screen 700 provides alarm banners 702 that display active alarms received by the DRSS 100. The alarm banners are prioritized, with the highest priority alarms presented first. Further, the characterization of the security events are provided by differentiating the banners 702. For example, banner 702A is a red banner and provides a textual indication, indicating that the security alert associated with banner 702A is characterized as a Severity 3 security event. In contrast, banners 702B-D are each associated with a security event characterized as a Severity 2 security event.

A silence button 704 is provided on the main display screen 700, which, when activated, silences any current audible alarms for a configurable amount of time (e.g., default time of 30 seconds). In some embodiments, the silence button 704 does not require user validation to be activated. However, as illustrated by the greyed out Clear All button 706 and the Clear button 708, in some embodiments, these options can only be selected upon logging in (e.g., by executing the login process by selecting login button 604).

Figure 8:
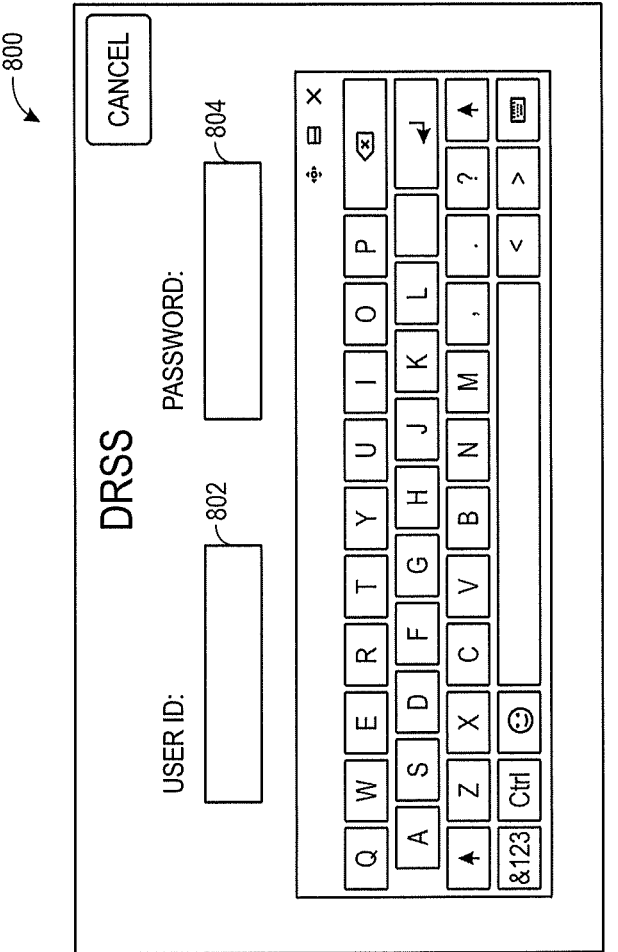
FIG. 8 is a schematic view of a GUI of the DRSS for logging in to specialized features, in accordance with an embodiment.

FIG. 8 is a schematic view of a GUI login screen 800, in accordance with an embodiment. The login screen 800 enables the operator to input login credentials (e.g., a user ID 802 and password 804). In alternative embodiments, other login credentials, such as biometrics, physical key, etc. may be used to login to the DRSS 100 application.

Figure 9:
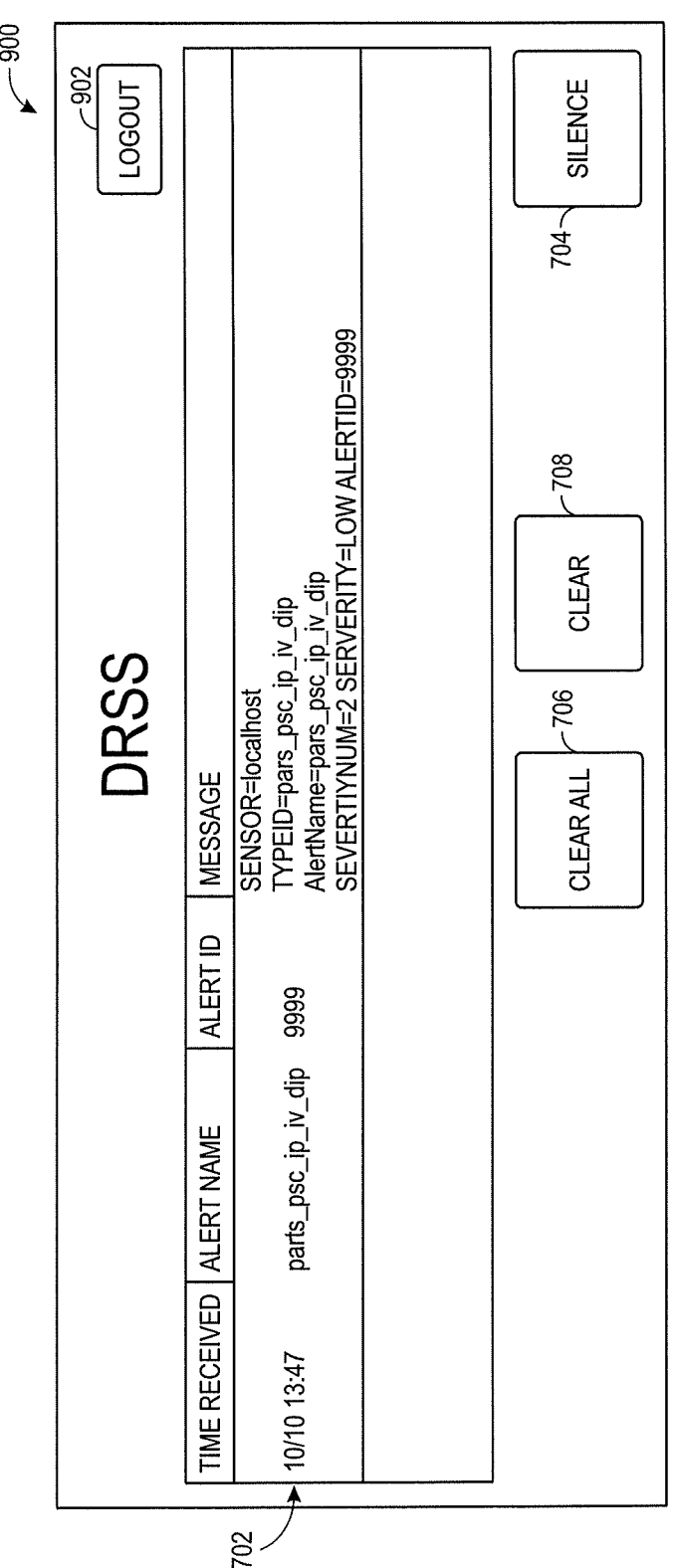
FIG. 9 is a schematic view of a GUI of the DRSS that presents specialized features after login, in accordance with an embodiment.

Once the operator is logged in, the Clear All button 706 and the Clear button 708 are enabled. FIG. 9 is a schematic view of a GUI main screen 900 that enables specialized features (e.g., Clear all button 706 and Clear button 708) after login, in accordance with an embodiment. The Clear All button 706, when selected, clears all alarms represented by an alarm banner 702 without regard to any selection of any alarm banner 702 rows. The Clear button 708, when selected, clears a security event associated with a selected alarm banner 702. To select an alarm banner 702, the operator may simply tap the alarm banner 702. The selected alarm banner 702 will change characteristics (e.g., color) to indicate that the alarm banner 702 is selected. Further, an alarm banner 702 can be unselected by tapping the alarm banner 702 a second time.

As illustrated, a logout button 902 is also provided after an operator is logged in. The logout button 902, when selected, will result in the operator being logged out (and the main screen 700 with greyed out options being displayed again).

Figure 10:
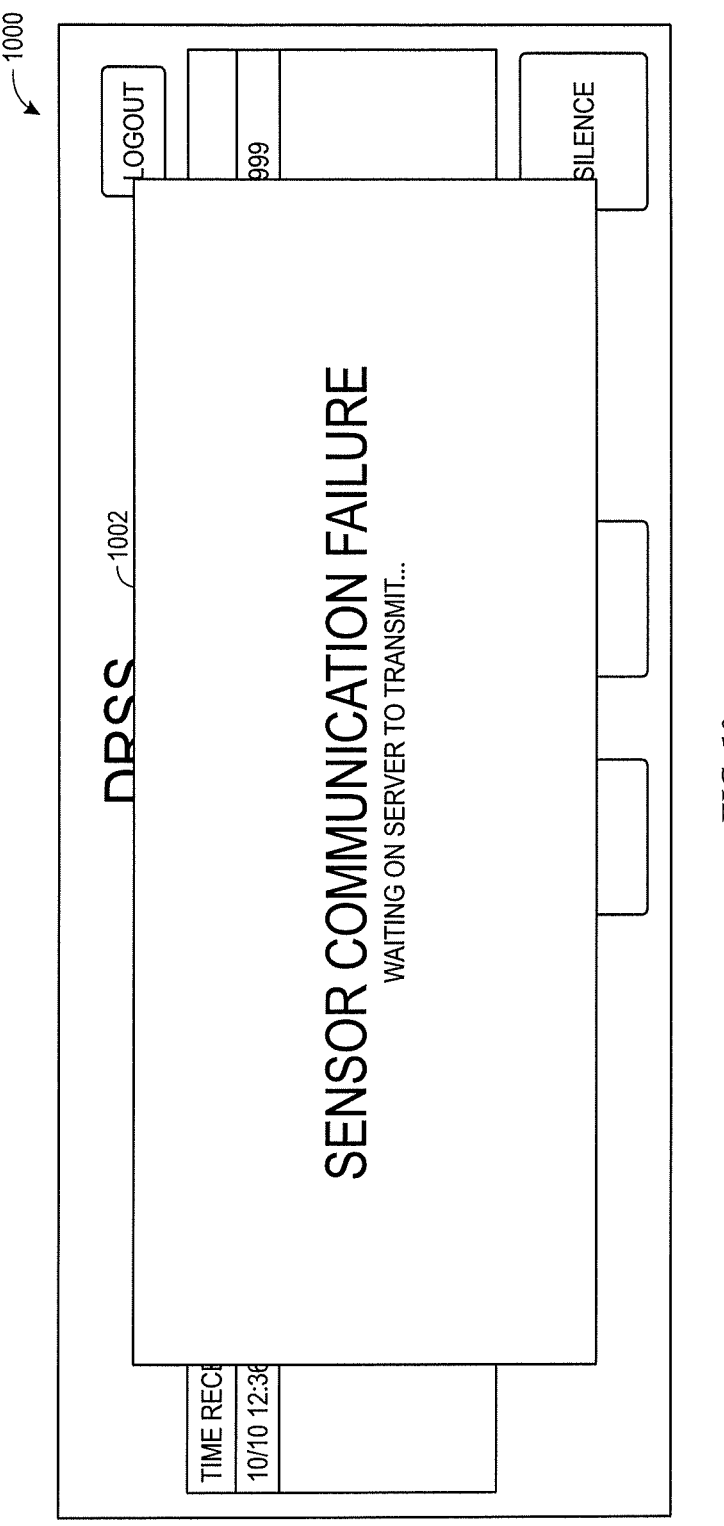
FIG. 10 is a schematic view of a GUI of the DRSS that presents an error, in accordance with an embodiment.

The DRSS 100, in addition to providing alarms generated from the security appliance 102, can generate alarms based upon localized events. For example, FIG. 10 is a schematic view of a GUI 1000 of the DRSS 100 that presents an error, in accordance with an embodiment. In the illustrated embodiment, a sensor communication failure message 1002 is presented, indicating that security events (e.g., Syslog messages) are not being received by the DRSS 100. To ensure that false errors are not presented when security events are not present, the DRSS 100 application can receive heartbeat messages from the security sensor (e.g., the Syslog Server/Security appliance 102) at fixed intervals. As used herein, heartbeat messages are periodic expected messages that can be used to determine when messages are not being received by the DRSS 100. If the heartbeat message is not detected, then the application will present the GUI 1000, indicating a heartbeat failure. Once the heartbeat message is detected, the GUI 1000 will disappear and the application will resume normal operations. In some embodiments, the interval of the heartbeat messages and a number of allowable missed heartbeat messages before generating an alarm is configurable.

The DRSS 100 may include additional local alarms. Below is a list of additional alarms, along with a severity characterization and a description.

| Alarm Name | Severity | Description |
| --- | --- | --- |
| power_supply_one | 2 | Unplugging power cable 1 from the back up unit or tripping the circuit breakerwill generate this alarm. To clear the alarm, the power cable is plugged in or the circuit breaker reset, and then the alarm is cleared from the GUI 900 of FIG. 9. |
| power_supply_two | 2 | Unplugging power cable from the back up unit or tripping the circuit breaker will generate this alarm. To clear the alarm, the power cable is plugged in or the circuit breaker reset, and then the alarm is cleared from the GUI 900 of FIG. 9. |
| circuit_breaker_tripped | 2 | Tripping a circuit breaker within the unit will generate this alarm. To clear the alarm, the circuit breaker is reset and then the alarm is cleared from the GUI 900 of FIG. 9. |
| domain_controller_comm | 2 | Communication loss with the domain controller will generate this alarm. To clear the alarm, the communication with the domain controller is restored and then the alarm is cleared from the GUI 900 of FIG. 9. |
| heartbeat | 2 | Communication loss with the security sensor will generate this alarm. This alarm not only shows up as an alarm banner, but also displays a full screen popup. To clear the alarm, the communication with the security sensor is restored and heartbeat messages are verified as being transmitted. |

As mentioned herein, the DRSS 100 may be configurable in many ways, creating a personalized alarm presentation and control experience that is suitable for a number of applications. The DRSS 100 application, in some embodiments, may include an XML, configuration file to load configurable parameters without needing to re-install the application. Below is a list of configuration parameters, default values, and a description for each of the configuration parameters. As may be appreciated, this is one list of possible configuration parameters, but is not intended to limit the scope to such configuration parameters. Indeed, fewer or more configuration parameters could be presented as options in alternative embodiments.

| Configuration Name | Default Value | Description |
| --- | --- | --- |
| Title | DRSS | This is the title of the application that is displayed on the Main Screen. |
| DBUpdateTimeInMinutes | 1 | This is the time interval at which the application checks for standard alarm color changes. Changing this parameter is not recommended. |
| HBIntervalInSeconds | 5 | The interval at which the application should check for a valid heartbeat. This should match the interval at which the security sensor/security appliance 102 is transmitting heartbeat messages. |
| HBAllowableMisses | 4 | The maximum allowable missed heartbeat messages before generating a heartbeat alarm. |
| ServerIPAddress | 0.0.0.0 | The IP address of the security sensor/security appliance 102 that is transmitting alarm messages. |
| ServerPortNumber | 514 | The port number utilized for alarm message transmission. 514 is the standard port for UDP messages. |
| SilenceButtonInSeconds | 30 | The time that the audible alarm will be silenced when the silence button is clicked. |
| HBEnabled | True | Enable/Disable the heartbeat functionality. |
| DCIPAdress | 0.0.0.0 | The IP address of the domain controller. |
| DCIntervalInSeconds | 20 | The interval at which the application checks communication with the domain controller. |
| DCPingEnabled | True | Enable/Disable domain controller communication checking. |
| AutoLogoutInSeconds | 30 | The time that a user will be automatically logged out of the application. |
| LightFlashingSpeedInMilliseconds | 500 | The speed at which the red-light flashes on critical alarms. |
| PLCIPAddress | 192.168.1.121 | The IP address of the internal PLC 116. |
| WatchdogEnabled | True | Enable/Disable software watchdog logic. |
| SoundChirpTimeInMilliseconds | 2000 | The time that the audible alarm will chirp when a new alarm is generated to grab the attention of the operator. |

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An electronic device, comprising:
a security appliance comprising a sensor configured to:
monitor a protected component for security events; and
generate one or more security event messages for the security events, wherein each of the one or more security event messages comprises a respective first code and a respective first severity, wherein the respective first code is one of a predefined list of a plurality of codes, wherein each of the plurality of codes is used to specify a respective type of program logging the one or more security event messages;
an embedded computer, comprising one or more processors configured to:
receive the one or more security event messages from the security appliance;
identify, from a first code in the one or more security event messages, an indication of a first type of program logging the one or more security event messages with a first severity classification;
translate, via a syslog mapping script, the one or more security event messages from the first severity classification to a first customized severity characterization based at least in part upon the indication of the first type of program logging the one or more security event messages, wherein the first customized severity characterization is different from a second customized severity characterization identified based at least in part upon an indication of a second type of program logging the one or more security event messages specified by a second code of the predefined list of the plurality of codes;

determine one or more presentation or control actions to be performed based upon the first customized severity characterization; and send instructions to a security appliance extension device to cause the security appliance extension device to automatically perform the one or more presentation or control actions comprising controlling a set of one or more lights to provide an indication of the first customized severity characterization using different lighting patterns.

2. The electronic device of claim 1, wherein the first customized severity characterization is determined by executing a mapping script that maps one or more characteristics of the one or more security event messages received by the security appliance to a particular customized severity characterization expected by the embedded computer.

3. The electronic device of claim 2, wherein the one or more characteristics of the one or more security event messages received by the security appliance comprises a first severity level and the particular customized severity characterization expected by the embedded computer is a second severity level.

4. The electronic device of claim 2, wherein the one or more processors of the embedded computer are configured to execute the mapping script.

5. The electronic device of claim 2, wherein the first customized severity characterization is received from the security appliance.

6. The electronic device of claim 1, comprising a display, wherein the one or more presentation or control actions comprises:

presenting, via a graphical user interface (GUI) on the display, one or more alarm banners associated with the one or more security event messages, the one or more alarm banners displayed based upon the first customized severity characterization.

7. The electronic device of claim 1, wherein the one or more presentation or control actions comprises modifying an operational status of the protected component.

8. The electronic device of claim 7, wherein the protected component comprises an amusement attraction.

9. The electronic device of claim 1, wherein the one or more security event messages comprise a message generated in accordance with a Syslog standard for message logging.

10. The electronic device of claim 1, comprising:

one or more input/output (I/O) devices configured to receive one or more I/O commands from an operator of the electronic device, or provide one or more output indications to the operator, or both; and a programmable logic controller (PLC) configured to:

receive I/O data indicative of the one or more I/O commands, and implement the one or more I/O commands; or receive the one or more output indications, and present the one or more output indications via the one or more I/O devices; or both.

11. The electronic device of claim 10, wherein the one or more I/O devices comprise the set of one or more lights that provide the indication of the first customized severity characterization;

wherein the set of one or more lights comprises a fault light that selectively indicates a critical severity security event when in a first state and a medium severity security event when in a second state; and wherein the set of one or more lights comprises a health light that indicates whether all expected interfaces are communicatively coupled to the electronic device.

12. The electronic device of claim 10, wherein the embedded computer is configured to:

determine when a continuously changing state of a variable of the PLC is not detected at the embedded computer within a threshold amount of time; and provide a fault in response to not detecting the continuously changing state of the variable within the threshold amount of time, the fault indicating a malfunction of the embedded computer.

13. The electronic device of claim 10, wherein the one or more I/O devices comprise a run/bypass switch that:

when in a run mode, causes logging and presentation of one or more alarm banners associated with the one or more security event messages and causes presentation of one or more alarms associated with the one or more security event messages, as they are received; and when in a bypass mode, causes logging and presentation of the one or more alarm banners associated with the one or more security event messages, and causes refrain from presentation of the one or more alarms associated with the one or more security event messages, as they are received.

14. The electronic device of claim 10, wherein the one or more I/O devices comprise a reset switch that, when set to a reset mode, causes the embedded computer to power down, or reboot, or both.

15. A tangible, non-transitory, computer-readable medium, comprising computer-readable instructions that, when executed by one or more processors of a computer system, cause the computer system to:

monitor, via a security appliance comprising a sensor, a protected component for security events;

generate, via the security appliance, one or more security event messages for the security events, wherein each of the one or more security event messages comprises a respective first code and a respective first severity, wherein the respective first code is one of a predefined list of a plurality of codes, wherein each of the plurality of codes is used to specify a respective type of program logging the one or more security event messages;

receive the one or more security event messages from the security appliance;

identify, from a first code in the one or more security event messages, an indication of a first type of program logging the one or more security event messages with a first severity classification;

translate, via a syslog mapping script, the one or more security event messages from the first severity classification to a first customized severity characterization based at least in part upon the indication of the first type of program logging the one or more security event messages, wherein the first customized severity characterization is different from a second customized severity characterization identified based at least in part upon an indication of a second type of program logging the one or more security event messages specified by a second code of the predefined list of the plurality of codes;

determine one or more presentation or control actions to be performed based upon the first customized severity characterization; and send instructions to a security appliance extension device to cause the security appliance extension device to automatically perform the one or more presentation or control actions comprising controlling a set of one or more lights to provide an indication of the first customized severity characterization using different lighting patterns.

16. The computer-readable medium of claim 15, comprising computer-readable instructions that, when executed by the one or more processors, cause the computer system to:

identify the first customized severity characterization by executing a mapping script to map one or more characteristics of the one or more security event messages received from the security appliance to a particular customized severity characterization expected by the computer.

17. The computer-readable medium of claim 15, comprising computer-readable instructions that, when executed by the one or more processors, cause the computer system to:

present one or more alarm banners corresponding to the one or more security event messages along with an indication of the first customized severity characterization of the one or more security event messages in a graphical user interface (GUI) of the computer.

18. The computer-readable medium of claim 15, comprising computer-readable instructions that, when executed by the one or more processors, cause the computer system to:

determine when a continuously changing state of a variable of a programmable logic controller (PLC) is not detected at the computer within a threshold amount of time; and provide a fault in response to not detecting the continuously changing state of the variable within the threshold amount of time, the fault indicating a malfunction of the computer system.

19. A computer-implemented method, comprising:

monitoring, via a security appliance, a protected component for security events;

generating one or more security event messages for the security events, wherein each of the one or more security event messages comprises a respective first code and a respective first severity, wherein the respective first code is one of a predefined list of a plurality of codes, wherein each of the plurality of codes is used to specify a respective type of program logging the one or more security event messages;

receiving, via a computer system, the one or more security event messages from the security appliance;

identifying, via the computer system, from a first code in the one or more security event messages, an indication of a first type of program logging the one or more security event messages with a first severity classification;

translating, via a syslog mapping script, the one or more security event messages from the first severity classification to a first customized severity characterization based at least in part upon the indication of the first type of program logging the one or more security event messages, wherein the first customized severity characterization is different from a second customized severity characterization identified based at least in part upon an indication of a second type of program logging the one or more security event messages specified by a second code of the predefined list of the plurality of codes;

determining one or more presentation or control actions to be performed based upon the first customized severity characterization; and sending instructions to a security appliance extension device to cause the security appliance extension device to automatically perform the one or more presentation or control actions comprising controlling a set of one or more lights to provide an indication of the first customized severity characterization using different lighting patterns.

20. The computer-implemented method of claim 19, comprising:

presenting, via a graphical user interface (GUI), one or more alarm banners associated with the one or more security event messages, the one or more alarm banners displayed based upon the first customized severity characterization.

21. The electronic device of claim 1, wherein the one or more security event messages comprise a syslog message and the first code in the one or more security event messages comprise a facility code.

* * * * *